United States Patent
Li

(10) Patent No.: US 12,106,448 B2
(45) Date of Patent: Oct. 1, 2024

(54) CAMERA EXTERNAL PARAMETER CALIBRATION METHOD AND SYSTEM FOR VEHICLE PANORAMIC SYSTEM, AND PANORAMIC SYSTEM

(71) Applicant: Black Sesame Technologies Inc., San Jose, CA (US)

(72) Inventor: Wenxue Li, Wuhan (CN)

(73) Assignee: Black Sesame Technologies Inc.

( * ) Notice: Subject to any disclaimer, the term of this patent is extended or adjusted under 35 U.S.C. 154(b) by 304 days.

(21) Appl. No.: 17/703,509

(22) Filed: Mar. 24, 2022

(65) Prior Publication Data

US 2022/0318949 A1    Oct. 6, 2022

(30) Foreign Application Priority Data

Mar. 31, 2021    (CN) .......................... 202110349097.7

(51) Int. Cl.
*G06T 3/40*       (2024.01)
*B60W 40/12*    (2012.01)
(Continued)

(52) U.S. Cl.
CPC .......... *G06T 3/4038* (2013.01); *B60W 40/12* (2013.01); *G06T 7/30* (2017.01); *G06T 7/85* (2017.01);
(Continued)

(58) Field of Classification Search
CPC .......... G06T 3/4038; G06T 7/80; G06T 7/30; G06V 20/56; B60W 40/12; B60W 2420/403
(Continued)

(56) References Cited

U.S. PATENT DOCUMENTS

| | | | |
|---|---|---|---|
| 2015/0304634 A1* | 10/2015 | Karvounis | ........ G06F 18/21355 348/46 |
| 2017/0127045 A1 | 5/2017 | Lin et al. | |
| 2018/0108150 A1* | 4/2018 | Curtis | ..................... G06T 7/246 |

FOREIGN PATENT DOCUMENTS

| | | |
|---|---|---|
| CN | 109615659 A | 4/2019 |
| WO | 2017101150 A1 | 6/2017 |

OTHER PUBLICATIONS

Liang Wang, Research on Trajectory Planning and Tracking Technology of Binocular Vision Robot, China Master's Theses Full-text Database, Jan. 15, 2018.

(Continued)

*Primary Examiner* — Allen H Nguyen
(74) *Attorney, Agent, or Firm* — Timothy T. Wang; Ni, Wang & Massand, PLLC

(57) ABSTRACT

An improved camera external parameter calibration method of a vehicle panoramic system, comprising: acquiring calibration images of a checkerboard by means of cameras; for each acquired calibration image, obtaining pixel coordinates of corner points in the image; obtaining first coordinates of each corner point in a vehicle coordinate system on the basis of relevant parameters of the panoramic camera; for a group of adjacent corner points among the corner points, determining a first and second deviation according to the first coordinates of each corner point in the group; for each corner point in the adjacent points of the group, calculating the distance difference of the corner point on the basis of the first coordinates obtained by two cameras; and performing optimization calculation on the external parameters on the basis of the first deviation, the second deviation and the distance difference so as to obtain the external parameters of the cameras.

9 Claims, 6 Drawing Sheets

(51) Int. Cl.
  *G06T 3/4038* (2024.01)
  *G06T 7/30* (2017.01)
  *G06T 7/80* (2017.01)
  *G06V 20/56* (2022.01)

(52) U.S. Cl.
  CPC ....... *G06V 20/56* (2022.01); *B60W 2420/403* (2013.01)

(58) Field of Classification Search
  USPC ........................................................ 382/284
  See application file for complete search history.

(56) References Cited

OTHER PUBLICATIONS

A. Marburg and A. Stewart, Extrinsic calibration of an RGB camera to a 3D imaging Sonar, Oceans 2015-MTS/IEEE Washington, Feb. 22, 2016.

* cited by examiner

CAMERA EXTERNAL PARAMETER CALIBRATION METHOD AND SYSTEM FOR VEHICLE PANORAMIC SYSTEM, AND PANORAMIC SYSTEM

CROSS REFERENCE TO RELATED APPLICATION

This patent application claims the benefit and priority of Chinese Patent Application No. 202110349097.7 filed on Mar. 31, 2021, the disclosure of which is incorporated by reference herein in its entirety as part of the present application.

TECHNICAL FIELD

The present application relates to automotive technology, and more particularly, to a camera external parameter calibration technology for a vehicle panoramic system.

BACKGROUND

Looking around a vehicle can provide a driver with a more convenient driving vision and improve driving safety. After panoramic cameras are installed on a vehicle, the panoramic cameras needs to be calibrated to acquire parameters of the panoramic cameras, so as to ensure correct splicing of panoramic views.

The conventional calibration method is relatively complex, needs to make a plurality of calibration checkerboards, and also needs to place the positions of the checkerboards according to the requirements and limit the position of the vehicle. FIG. 1 illustrates a conventional panoramic calibration scenario. As shown in FIG. 1, a plurality of checkerboards 101 are arranged around the vehicle 10, and the arrangement of the checkerboards is strictly set with respect to the position of the vehicle. This method involves more human intervention and is not convenient enough.

It is necessary to propose improvements to the calibration method for looking around of the vehicle.

SUMMARY

In view of the described content, the present application provides an improved camera external parameter calibration method of a vehicle panoramic system. According to one aspect of the present application, the camera external parameter calibration method for a vehicle panoramic system comprises: acquiring calibration images of a checkerboard by means of cameras, wherein, the checkerboard is placed in positions that enable an image captured by each camera to include two unobstructed checkerboard images; for each acquired calibration image, obtaining pixel coordinates of corner points in the image; obtaining first coordinates of each corner point in a vehicle coordinate system on the basis of relevant parameters of the panoramic camera; for a group of adjacent corner points among the corner points, determining a first deviation and a second deviation according to the first coordinates of each corner point in the group of corner points, wherein the first deviation is a difference between an included angle between the group of corner points and 90°, and the second deviation is a difference between the distance between the adjacent corner points and the real side length of the checkerboard; for each corner point in the group of adjacent corner points, calculating a distance difference of the corner point on the basis of the first coordinates obtained by two cameras, the first coordinates respectively corresponding to the calibration images obtained by two adjacent cameras; and performing optimization calculation on external parameters on the basis of the first deviation, the second deviation and the distance difference so as to obtain the external parameters of the cameras.

In the method, optionally, the adjacent corner points are located on the same checkerboard.

In the method, optionally, the optimization calculation of the external parameters based on the first deviation, the second deviation and the distance difference is performed by taking the external parameters as variables to be optimized and taking a weighted sum of the first deviation, the second deviation and the distance difference as an optimization target.

According to an example of the present application, also provided is a camera external parameter calibration system, which is used for a vehicle panoramic system. The system includes cameras provided on a vehicle, the cameras being configured to acquire calibration images of a checkerboard, wherein the checkerboard is placed in positions that enable an image acquired by each camera to include two unobstructed checkerboard images; a memory used for storing instructions; and a processor used for executing the instructions. When the processor executes the instructions, the following process is implemented: for each acquired calibration image, calculating pixel coordinates of corner points in the image; obtaining first coordinates of each corner point in a vehicle coordinate system on the basis of relevant parameters of the panoramic camera; for a group of adjacent corner points among the corner points, determining a first deviation and a second deviation according to the first coordinates of each corner point in the group of corner points, wherein the first deviation is a difference between an included angle between the group of corner points and 90°, and the second deviation is a difference between the distance between the adjacent corner points and the real side length of the checkerboard; for each corner point in the group of adjacent corners, calculating a distance difference of the corner point on the basis of the first coordinates obtained by two cameras, the first coordinates respectively corresponding to the calibration images obtained by two adjacent cameras; and performing optimization calculation on external parameters on the basis of the first deviation, the second deviation and the distance difference, so as to obtain the external parameters of the cameras.

According to an example of the present application, also provided is a vehicle panoramic system, which either performs the external parameter calibration method described above, or includes the external parameter calibration system described above.

DETAILED DESCRIPTION OF THE EMBODIMENTS

Hereinafter, specific embodiments of the present invention will be described in detail with reference to the accompanying drawings. It should be appreciated that the present invention can be implemented in many other ways than those described herein, and that similar modifications may be made by a person skilled in the art without departing from the scope of the invention. Therefore, the invention is not to be limited by the specific embodiments disclosed below.

The vehicle panoramic cameras generally include cameras provided at the front, rear, left and right sides of a vehicle. The internal parameters and distortion parameters of these cameras have been calibrated before being installed on the vehicle. Therefore, after installation, only the external parameters of the cameras need to be calibrated, that is, only the position/angle parameters of the cameras relative to a vehicle coordinate system need to be calibrated.

It should be noted that the term "camera" should be understood in a broad sense herein and refers to a device capable of capturing images, sounds, and videos, such as a CCD sensor, a CMOS sensor, a camera, or other devices including a CCD sensor or a CMOS sensor, and more specifically, for example, a fisheye camera.

After the position/angle parameters of each camera are obtained by calibration, the mathematical expression is a rotation matrix R of 3×3 and a translation matrix T of 3×1. Thus, for a certain point P(X, Y, Z) in a vehicle coordinate system, the coordinates of the point in the camera coordinate system are P'(X', Y', Z'), and the relationship between P' and P is as shown in equation (1):

$$\begin{bmatrix} X' \\ Y' \\ Z' \\ 1 \end{bmatrix} = \begin{bmatrix} R & T \\ 0\ 0\ 0 & 1 \end{bmatrix} \begin{bmatrix} X \\ Y \\ Z \\ 1 \end{bmatrix} \quad (1)$$

After the coordinate transformation from the vehicle coordinate system to the camera coordinate system is completed according to equation (1), the transformation from the camera coordinate system to the pixel coordinate system can be calculated according to the internal parameters and distortion parameters of the cameras, and then the transformation from the vehicle coordinate system to the camera pixel coordinate system is completed. Briefly, the internal parameters of the cameras are pre-calibrated, and the essence of the panoramic calibration is a process of determining the matrix [R T].

The above is a brief description of the basic principle for looking around of the vehicle, and this is a technology known in the art.

Figure 1:
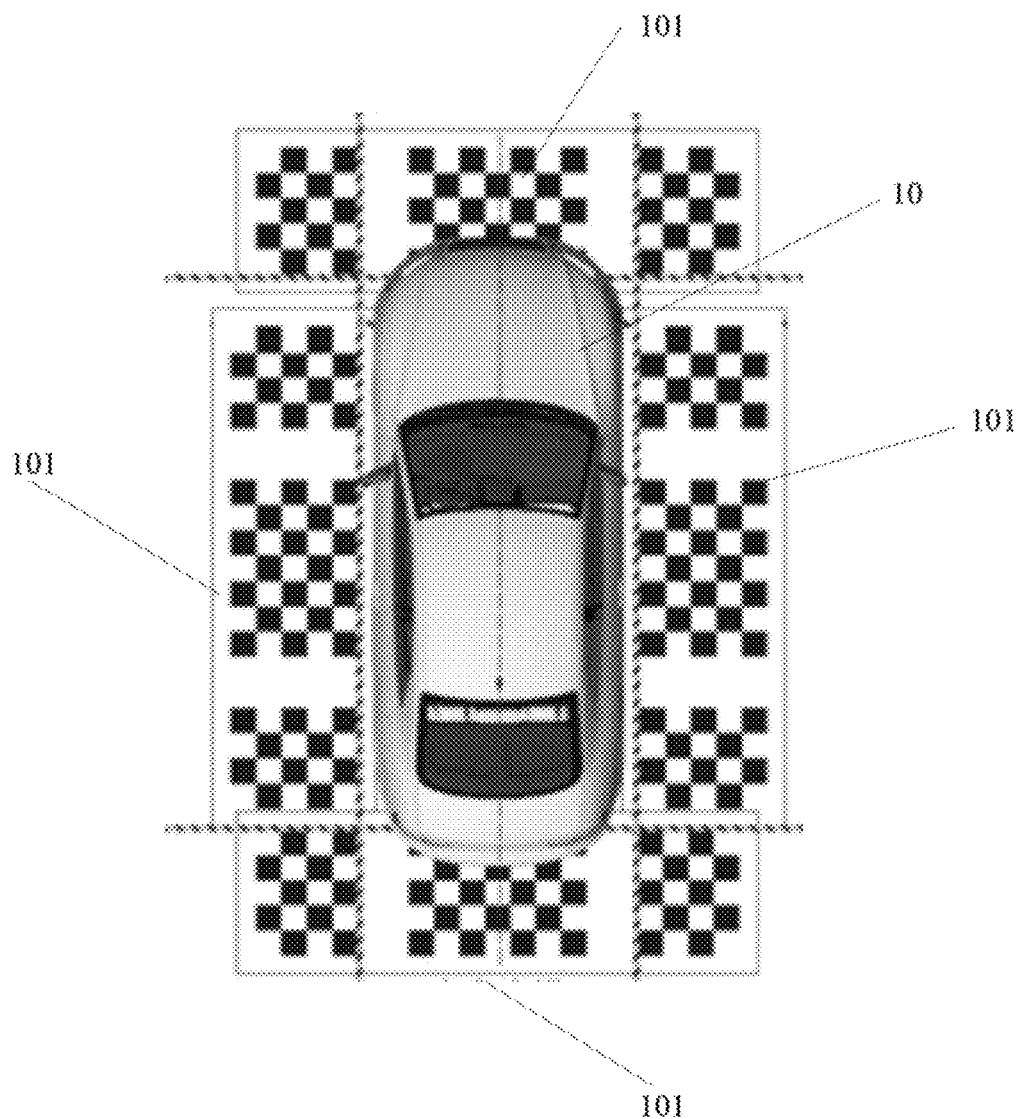
FIG. 1 illustrates a conventional panoramic calibration scenario.
Figure 2:
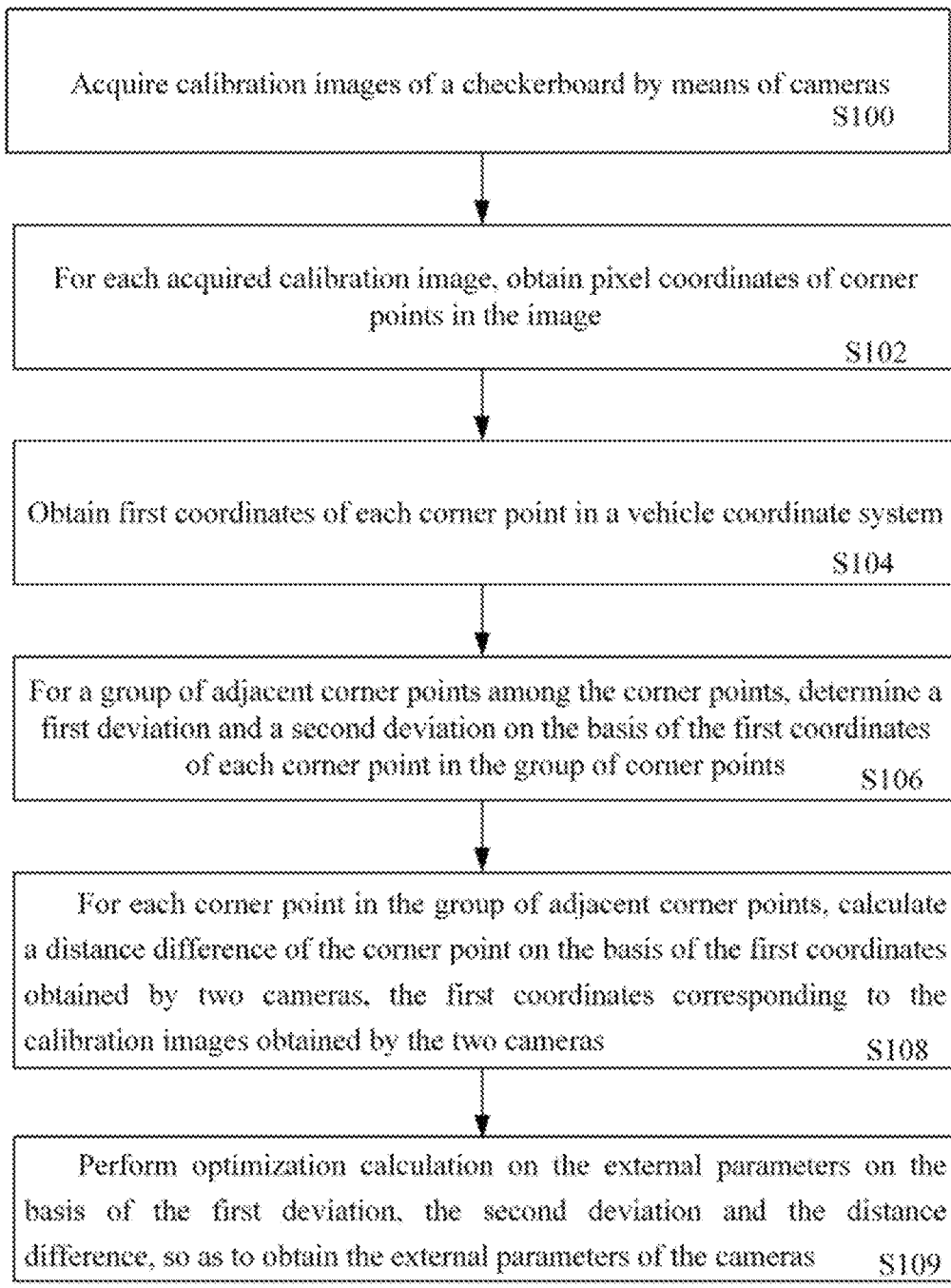
FIG. 2 is a flow chart of a camera external parameter calibration method for a vehicle panoramic system according to an example of the present application.

FIG. 2 is a flow chart of a camera external parameter calibration method for a vehicle panoramic system according to an example of the present application. As shown in the drawing, in step S100, acquire calibration images of a checkerboard by cameras, wherein the checkerboard is placed in positions that enable an image captured by each camera to include two unobstructed checkerboard images. By way of example and not limitation, the cameras are provided on the front end, rear end, left side, and right side of the vehicle. Only one checkerboard can be used here, and for each camera, the checkerboard can be placed in a position that enables an image acquired by the camera to include two unobstructed checkerboard images. In step S102, for each acquired calibration image, obtain pixel coordinates of corner points in the image. In step S104, obtain first coordinates of each corner point in a vehicle coordinate system on the basis of relevant parameters of the panoramic camera, the first coordinates also being referred to herein as vehicle coordinates.

By way of example, any fisheye camera in a vehicle panoramic system (which is, for example, provided on the left side) is taken as an example. For a corner point P' of an image captured by the fisheye camera, the transformation process of its projection to the pixel coordinate system (u, v) is shown in equation (2):

$$\begin{cases} \theta = \arctan\left(\sqrt{(X'/Z')^2 + (Y'/Z')^2}\right) \\ \theta_d = \theta + k_0\theta^3 + k_0\theta^5 + k_2\theta^7 + k_3\theta^9 \\ r = (f_x + f_y)/2 * \theta_d \\ x = rX'/\sqrt{X'^2 + Y'^2} \\ y = rY'/\sqrt{X'^2 + Y'^2} \\ u = x + c_x \\ v = y + c_y \end{cases} \quad (2)$$

Wherein, the internal parameters of the fisheye camera are $[f_x, f_y, c_x, c_y]$, and the distortion parameters thereof are $[k_0, k_1, k_2, k_3]$.

Insofar as the pixel coordinates (u, v) are known, the camera coordinates P'(X', Y', Z') can be obtained by performing an inverse operation according to equation (2); and then according to equation (1) described above, the coordinates P(X, Y, Z) in the vehicle coordinate system are obtained by performing an inverse operation using the initial external parameters of the fisheye camera.

Return to FIG. 2. In step S108, for a group of adjacent corner points among the corner points, determine a first deviation and a second deviation according to the first coordinates of each corner point in the group of corner points, wherein the first deviation is a difference between an included angle between the group of corner points and 90°, and the second deviation is a difference between the distance between the adjacent corner points and the real side length of the checkerboard.

Figure 3:
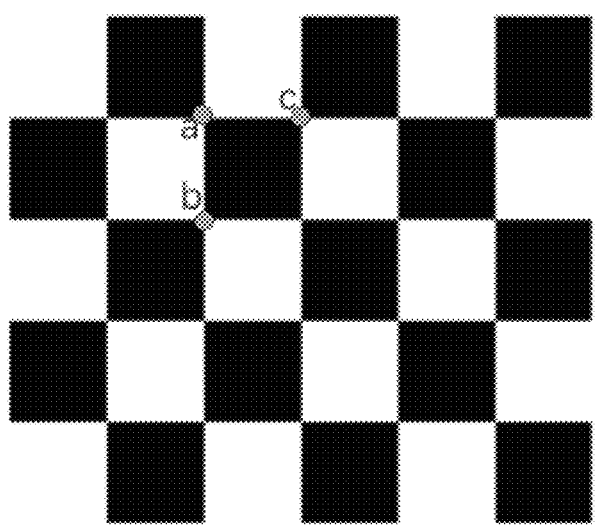
FIG. 3 shows three adjacent corner points a, b and c in an exemplary checkerboard image.

FIG. 3 shows three adjacent corner points a, b, and c in an exemplary checkerboard image. Assume that they are all located on the same checkerboard at the upper left corner of the checkerboard. The three adjacent corner points a, b, and c are respectively projected to three pixel points [($u_a'$, $v_a'$), ($u_b'$, $v_b'$), ($u_c'$, $v_c'$)] on the left camera of the vehicle panoramic cameras, wherein the subscript of each pixel point indicates whether the coordinates refers to pixel a, b, or c. The three adjacent corner points a, b, and b are projected to three pixel points [($u_a''$, $v_a''$), ($u_b''$, $v_b''$), ($u_c''$, $v_c''$)] on the front camera of the vehicle panoramic cameras.

The coordinates [($X_a'$, $Y_a'$, $Z_a'$), ($X_b'$, $Y_b'$, $Z_b'$), ($X_c'$, $Y_c'$, $Z_c'$)] of the three pixel points of the left camera in the vehicle coordinate system and the coordinates [($X_a''$, $Y_a''$, $Z_a''$), ($X_b''$, $Y_b''$, $Z_b''$), ($X_c''$, $Y_c''$, $Z_c''$)] of the three pixel points of the front camera in the vehicle coordinate system can be obtained by using equation (2) described above.

As the checkerboard is located on the ground in the vehicle coordinate system, here $Z_a'=Z_b'=Z_c'=Z_a''=Z_b''=Z_c''=0$. At the same time, in theory, $X_a'=X_a''$, $Y_a'=Y_a''$, $X_b'=X_b''$, $Y_b'=Y_b''$, $X_c'=X_c''$, $Y_c'=Y_c''$ should be satisfied. However, this is not always true in practice due to the incorrect initial external parameters.

For each corner point, three deviation items are determined, namely a first deviation, a second deviation, and a distance difference. It is illustrated by the pixel point ($u_a'$, $v_a'$) projected on the left camera by the corner point a. The first deviation is a difference between the included angle of the horizontally and vertically arranged corner points and 90°, and the difference $e_1 = (X_b' - X_a') * (X_c' - X_a') + (Y_b' - Y_a') * (Y_c' - Y_a')$. The smaller the difference $e_1$ between the included angle and 90°, the smaller the absolute value. The included angle between the horizontal and vertical points is the included angle between ba and ac, i.e. ∠bac.

The second deviation is the difference $e_2$ between the distance of adjacent corner points and the real side length of the checkerboard. Assuming that the length of the checkerboard is L, it is defined that $e_2 = \sqrt{(X_b' - X_a')^2 + (Y_b' - Y_a')^2} - L + \sqrt{(X_c' - X_a')^2 + (Y_c' - Y_a')^2} - L$. The smaller the absolute value is, the more accurate the calibration result is.

For the corner point a, the coordinates of the left camera in the vehicle coordinate system are ($X'_a$, $Y'_a$, $Z'_a$), and the coordinates of the front camera in the vehicle coordinate system are ($X''_a$, $Y''_a$, $Z''_a$). The smaller the distance difference $e_3 = |X''_a - X'_a| + |Y''_a - Y'_a| \Delta e_3$ is, the more accurate the external parameter calibration result is.

In step S109, perform optimization calculation on the external parameters on the basis of the first deviation, the second deviation, and the distance difference, so as to obtain the external parameters of the cameras. In some examples, the optimization calculation of the external parameters based on the first deviation, the second deviation, and the distance difference is performed by taking the external parameters as variables to be optimized, and taking the weighted sum of the first deviation, the second deviation and the distance difference as an optimization target.

As an example, the calculation of the external parameters after optimization can be obtained according to the following formula (3):

$$A' = \underset{A}{\mathrm{argmin}}\, Et(A) \quad (3)$$

Wherein, A' represents the external parameters after optimization calculation; Et is a weighted sum of the first deviation, the second deviation, and the distance difference, with the weighting coefficient for the first deviation being, for example, 1, the weighting coefficient for the second deviation being, for example, 2.5, and the weighting factor for the distance difference being, for instance, 5; A refers to the initial external parameters of the camera;

$$\underset{A}{\mathrm{argmin}}\, Et(A)$$

means that the formula is solved with the object of minimizing Et, A is the variable to be solved and Et can be calculated by A; and A' is the external parameters that enable Et to be minimized.

Figure 4:
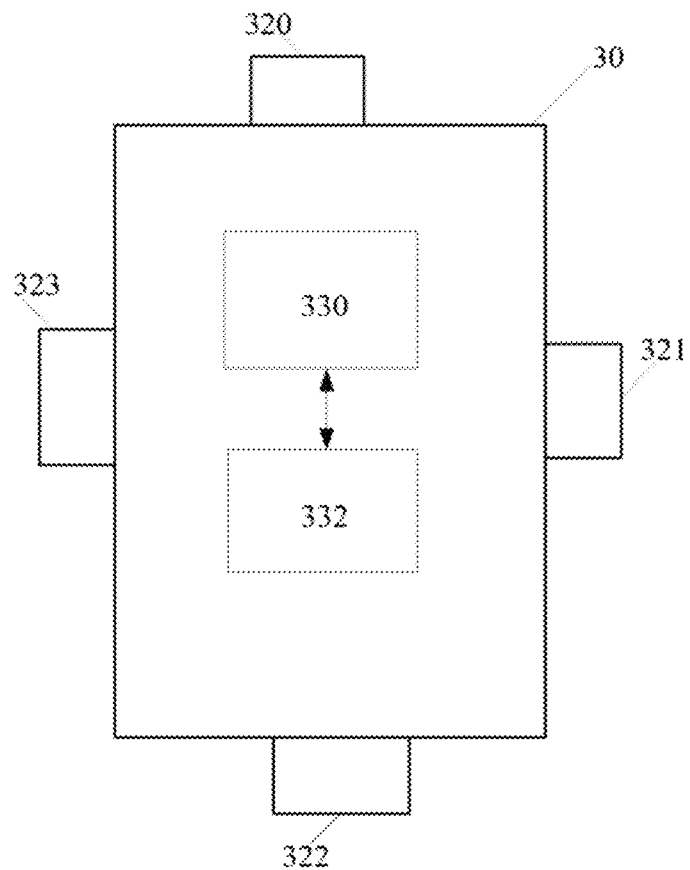
FIG. 4 is a schematic structural diagram of a camera external parameter calibration system according to an example of the present application.

According to an example of the present application, a camera external parameter calibration system is also provided. FIG. 4 is a schematic structural diagram of a camera external parameter calibration system according to an example of the present application. As shown, the system includes cameras provided on a vehicle 30, such as a camera 320 provided at the front end of the vehicle, a camera 322 provided at the rear end of the vehicle, a camera 321 on the left side of the vehicle and a camera 323 on the right side of the vehicles. The cameras are configured to acquire calibration images of the checkerboard, and the checkerboard is placed in positions that enable an image acquired by each of adjacent cameras to include a complete checkerboard. By way of example, such positions may be at the upper left, upper right, lower left, and lower right corners of the vehicle. The camera external parameter calibration system further includes a memory 330 and a processor 332. The memory 330 stores instructions. In the process of executing these instructions, the processor 332 implements the process described above with reference to FIG. 2, which will not be described again.

According to some examples of the present application, the memory 330 may be an existing storage component in the vehicle, and the processor 332 may be provided as an independent processor, or the processor 332 may be implemented in an existing controller of the vehicle.

Each camera external parameter calibration method according to the example of the present application may use the camera external parameter calibration system described with reference to FIG. 4, or may be directly implemented in a vehicle panoramic system.

The present application also provides a vehicle panoramic system. The panoramic system includes cameras provided on the vehicle. The vehicle uses the camera external parameter calibration method described above with reference to FIG. 2. Alternatively, the camera external parameter calibration system described above may be used in the vehicle panoramic system provided in the present application.

Figure 5A:
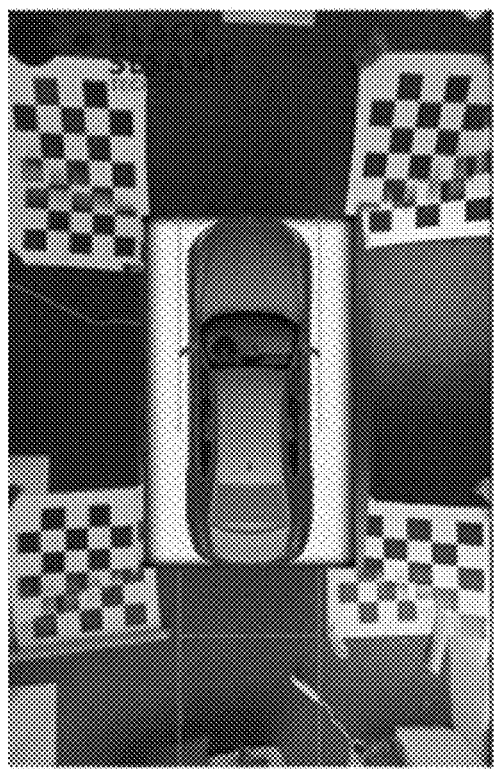
FIG. 5a shows a splicing result of checkerboard images acquired by the panoramic cameras before calibration.
Figure 5B:
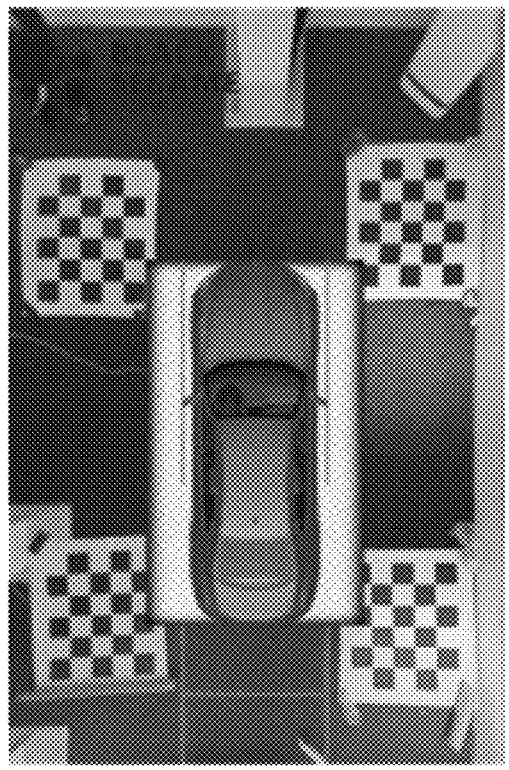
FIG. 5b shows a splicing result of images acquired by the panoramic system after using the external parameter calibration method or the external parameter calibration system according to the present application.

FIG. 5a shows a splicing result of the checkerboard images acquired by the panoramic cameras before calibration. As shown in the drawing, the misalignment of the image splicing is obvious. FIG. 5b shows a splicing result of the images acquired by the panoramic system after the external parameter calibration method or the external parameter calibration system according to the present application is used. Obviously, the misalignment of the image splicing is greatly reduced, and the improvement effect is obvious.

According to the external parameter calibration method or the external parameter calibration system, the first deviation, the second deviation and the distance difference are introduced, and the calculation of the external parameters is optimized on the basis of the first deviation, the second deviation and the distance difference, so that the requirements on the placement positions of the checkerboard are reduced. Compared with the current conventional technology, according to the present application, in a case where there are four cameras, the same checkerboard can be placed on the upper left, lower left, upper right and lower right corners of the vehicle in four times, and one image is acquired each time. This will bring great convenience to the recalibration in the later stage of looking around or the calibration operation (calibration by laying a checkerboard manually) of looking around after installation. In addition, the external parameters obtained according to the present application improve the accuracy of the spliced image.

The embodiments above only represent several embodiments of the present invention, and the description thereof is more specific and detailed, but should not be construed as limiting the scope of the present invention. It should be noted that, for a person skilled in the art, various modifications and improvements may be made without departing from the concept of the present invention, and all of these fall within the scope of the present invention. Therefore, the scope of protection of the present invention patent should be determined by the following claims.

What is claimed is:

1. A camera external parameter calibration method for a vehicle panoramic system, the method comprising:
   acquiring calibration images of a checkerboard by means of cameras, wherein the checkerboard is placed in positions that enable an image acquired by each of adjacent cameras to include a complete checkerboard;
   for each acquired calibration image, obtaining pixel coordinates of corner points in the image;
   obtaining first coordinates of each corner point in a vehicle coordinate system on the basis of relevant parameters of the panoramic camera;
   for a group of adjacent corner points among the corner points, determining a first deviation and a second deviation according to the first coordinates of each corner point in the group of corner points, wherein the first deviation is a difference between an included angle between the group of corner points and 90°, and the second deviation is a difference between the distance between the adjacent corner points and the real side length of the checkerboard;
   for each corner point in the group of adjacent corner points, calculating a distance difference of the corner point on the basis of the first coordinates obtained by two cameras, the first coordinates corresponding to the calibration images obtained by the two adjacent cameras; and
   performing optimization calculation on external parameters on the basis of the first deviation, the second deviation, and the distance difference to obtain the external parameters of the cameras.

2. The method according to claim 1, wherein the adjacent corner points are located on the same checkerboard.

3. The method according to claim 1, wherein the optimization calculation of the external parameters based on the first deviation, the second deviation, and the distance difference is performed by taking the external parameters as variables to be optimized and using a weighted sum of the first deviation, the second deviation, and the distance difference as an optimization target.

4. A vehicle panoramic system, comprising cameras provided on a vehicle, and the vehicle panoramic system being configured to perform the method according to claim 1.

5. A camera external parameter calibration system for a vehicle panoramic system, the system comprising:
   cameras provided on a vehicle, the cameras being configured to acquire calibration images of a checkerboard, wherein the checkerboard is placed in positions that enable an image acquired by each of adjacent cameras to include a complete checkerboard;
   a memory used for storing instructions;
   a processor used for executing the instructions, and when the instructions are executed, implementing the following process:
   for each acquired calibration image, calculating pixel coordinates of corner points in the image;
   obtaining first coordinates of each corner point in a vehicle coordinate system on the basis of relevant parameters of the panoramic camera;
   for a group of adjacent corner points among the corner points, determining a first deviation and a second deviation according to the first coordinates of each corner point in the group of corner points, wherein the first deviation is a difference between an included angle between the group of corner points and 90°, and the second deviation is a difference between the distance between the adjacent corner points and the real side length of the checkerboard;
   for each corner point in the group of adjacent corner points, calculating the distance difference of the corner point on the basis of the first coordinates obtained by two cameras, the first coordinates corresponding to the calibration images obtained by two adjacent cameras; and
   performing optimization calculation on the external parameters on the basis of the first deviation, the second deviation, and the distance difference to obtain the external parameters of the cameras.

6. The system according to claim 5, wherein the cameras are provided on the front, rear, left and right sides of the vehicle.

7. The system according to claim 5, wherein the adjacent corner points are located on the same checkerboard.

8. The system according to claim 5, wherein the optimization calculation performed by the processor on the external parameters based on the first deviation, the second deviation, and the distance difference is performed by taking the external parameters as variables to be optimized and taking a weighted sum of the first deviation, the second deviation, and the distance difference as an optimization target.

9. A vehicle panoramic system, comprising the camera external parameter calibration system according to claim 5.

* * * * *